(12) United States Patent
Conner

(10) Patent No.: US 9,700,021 B2
(45) Date of Patent: Jul. 11, 2017

(54) BIRD SCREEN

(71) Applicant: Randy Conner, Eden, NY (US)

(72) Inventor: Randy Conner, Eden, NY (US)

( * ) Notice: Subject to any disclaimer, the term of this patent is extended or adjusted under 35 U.S.C. 154(b) by 246 days.

(21) Appl. No.: 14/499,428

(22) Filed: Sep. 29, 2014

(65) Prior Publication Data

US 2015/0090187 A1 Apr. 2, 2015

Related U.S. Application Data

(60) Provisional application No. 61/883,243, filed on Sep. 27, 2013.

(51) Int. Cl.
*A01K 39/01* (2006.01)
*E04H 12/22* (2006.01)
*A01K 39/014* (2006.01)

(52) U.S. Cl.
CPC .......... *A01K 39/0113* (2013.01); *A01K 39/01* (2013.01); *A01K 39/014* (2013.01); *E04H 12/2215* (2013.01)

(58) Field of Classification Search
CPC ........ A01K 31/00; A01K 31/12; A01K 39/01; A01K 39/0113
USPC ...................... 119/52.2, 52.3, 57.8, 57.9, 429
See application file for complete search history.

(56) References Cited

U.S. PATENT DOCUMENTS

| | | | | |
|---|---|---|---|---|
| 2,931,336 A | * | 4/1960 | Cather ............... | A01K 39/0113 119/52.3 |
| 3,301,217 A | * | 1/1967 | Prowinsky ......... | A01K 39/0113 119/57.9 |
| 3,780,703 A | * | 12/1973 | Boehland, Jr. ........ | A01K 39/012 119/53 |
| 4,389,975 A | * | 6/1983 | Fisher, Jr. .......... | A01K 39/0113 119/52.3 |
| 4,765,277 A | * | 8/1988 | Bailey .................. | E04H 12/182 119/428 |
| 4,829,934 A | * | 5/1989 | Blasbalg .............. | A01K 39/012 119/57.8 |
| 4,955,319 A | * | 9/1990 | Brucker ............... | A01K 39/012 119/52.2 |
| 5,033,411 A | * | 7/1991 | Brucker ............... | A01K 39/012 119/52.2 |
| 5,189,984 A | * | 3/1993 | Smith .................... | A01K 39/01 119/52.2 |
| 5,195,460 A | * | 3/1993 | Loken .................. | A01K 39/012 119/52.3 |
| 5,291,855 A | * | 3/1994 | Laverty ............... | A01K 39/0113 119/52.3 |

(Continued)

*Primary Examiner* — David Parsley
(74) *Attorney, Agent, or Firm* — Del Vecchio and Stadler LLP

(57) ABSTRACT

A bird screen is provided having a post assembly and a feeder assembly. The post assembly has a ground spike and a first support pipe is disposed internal to the ground spike. A second support pipe is disposed in the first support pipe and the second support pipe has a locking collar that supports the bird feeder assembly. The bird feeder assembly has a frame that is supported by the locking collar. The second support pipe extends through the frame and a screen and a bird feeder cover and into a birdfeeder to secure the birdfeeder in place. The feeder assembly has first, second, third and fourth support posts, and has first, second, third and fourth feeder sidewalls at least one of which is connected to the frame with hinges and is movable between up and down positions on hinges.

2 Claims, 14 Drawing Sheets

(56) References Cited

U.S. PATENT DOCUMENTS

| | | | | | |
|---|---|---|---|---|---|
| 5,558,040 | A | * | 9/1996 | Colwell | A01K 39/012 119/52.2 |
| 5,775,256 | A | * | 7/1998 | Henshaw | A01K 39/014 119/166 |
| 6,269,771 | B1 | * | 8/2001 | Cotter | A01K 39/0113 119/57.9 |
| 6,354,244 | B1 | * | 3/2002 | Green | A01K 39/014 119/429 |
| 6,360,690 | B1 | * | 3/2002 | Canby | A01K 39/012 119/429 |
| 6,397,779 | B1 | * | 6/2002 | Bonne | A01K 45/007 119/6.8 |
| 6,401,658 | B1 | * | 6/2002 | Teets | A01K 5/0114 119/51.01 |
| 6,986,322 | B2 | * | 1/2006 | Lumpkin | A01K 39/0113 119/52.3 |
| 7,373,901 | B2 | * | 5/2008 | Baynard | A01K 39/012 119/52.3 |
| 7,409,922 | B1 | * | 8/2008 | Baynard | A01K 39/012 119/52.3 |
| 7,654,225 | B2 | * | 2/2010 | Madsen | A01K 39/012 119/52.3 |
| 7,798,099 | B2 | * | 9/2010 | Vosbikian | A01K 39/012 119/52.2 |
| 7,930,995 | B2 | * | 4/2011 | Vosbikian | A01K 39/014 119/57.8 |
| 8,413,605 | B2 | * | 4/2013 | Baynard | A01K 39/0113 119/52.3 |
| 2011/0259272 | A1 | * | 10/2011 | Traska | A01K 39/0113 119/57.9 |

* cited by examiner

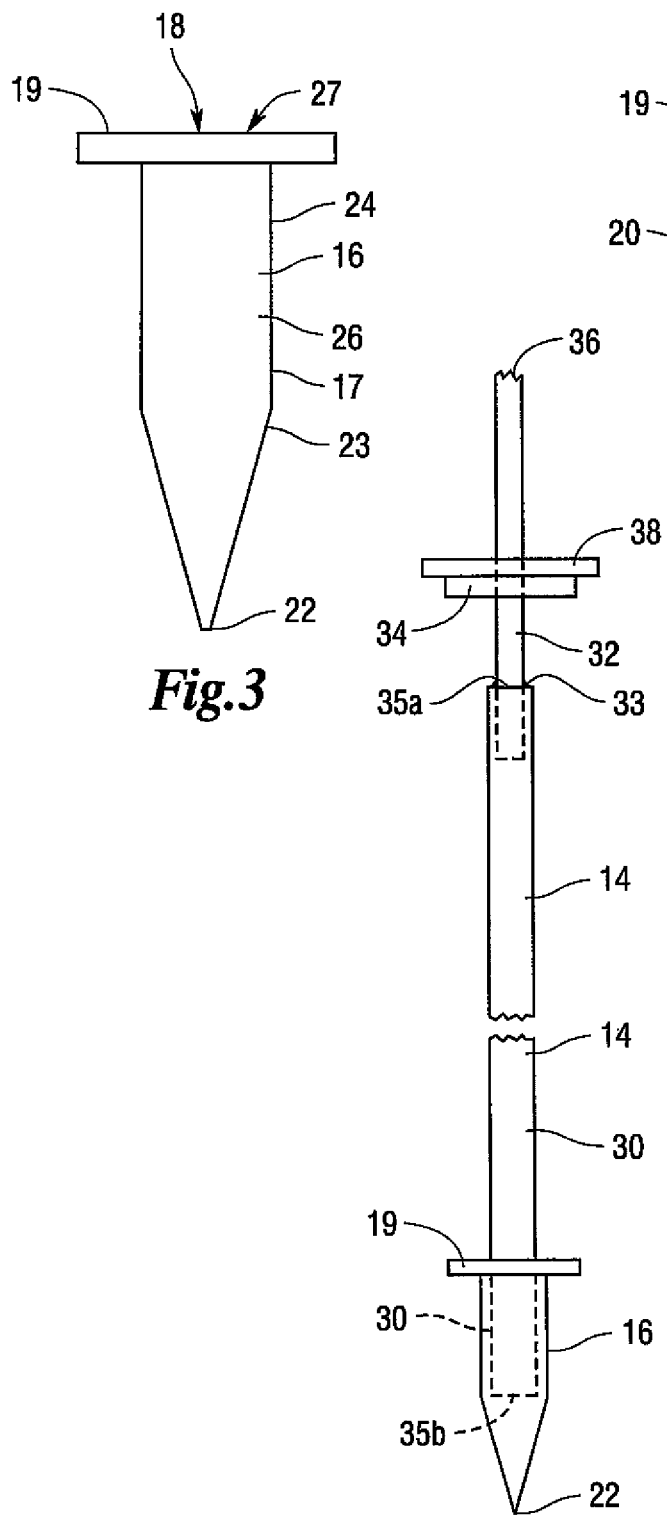
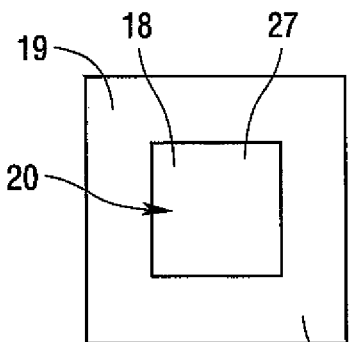
Fig.3
Fig.4
Fig.5

BIRD SCREEN

CROSS REFERENCE TO RELATED APPLICATIONS

This application claims the benefit of U.S. Provisional Patent Application having Ser. No. 61/883,243 filed on Sep. 27, 2013 the entire disclosure and contents of which are hereby incorporated herein by reference.

BACKGROUND

People enjoy placing birdfeeders in their yards because they enjoy the relaxation associated with watching birds feeding at their feeders. A vast array of different bird species can be seen in a short amount of time. However, there is a problem with birdfeeders, namely, sometimes the birdseed or bird food dispensed from the bird feeder ends up on the lawn. This spilled birdseed attracts squirrels, rats, mice, raccoons, and other varmints. Another problem associated with bird feeders is animals getting into the bird feeders and causing havoc and destroying the birdfeeder.

Thus, there is a need for a birdfeeder that provides birds with food and is sturdy, and at the same time does not allow the birdseed to end up on the ground yet allows people to enjoy watching birds feeding at their bird feeders.

SUMMARY

A bird screen for feeding birds is provided. The bird screen includes a bird feeder assembly and a pipe support assembly. The pipe support assembly is for supporting and elevating the bird feeder assembly above the surrounding ground such that the birdseed is accessible to birds while at the same time it is inaccessible to varmints.

The pipe assembly has a ground spike that is driven into the ground. The ground spike has a ground spike opening and the ground spike defines a ground spike interior. The pipe assembly further includes a first support pipe having opposed first and second first support pipe ends and wherein the second support pipe end is disposed in the ground spike interior and the first support pipe end is exposed. The first support pipe has an internal diameter, and the pipe assembly includes a second support pipe having an external diameter that is less than the internal diameter of the first support pipe. A portion of the second support pipe is fitted in the first support and joined to the first support pipe.

The pipe assembly further includes a locking collar that is fitted around the second support pipe and held in place such that it is spaced from first support pipe end and the exposed end of the second support pipe. The bird feeder is adapted to fit on the second support pipe such that the bird feeder assembly is supported on the locking collar.

The bird feeder assembly includes a frame having opposed first and second support members that are connected to opposed third and fourth support members and includes a pair of parallel first and second cross support members that are connected to each of the third and fourth support members, and includes a pair of parallel first and second internal cross member that are each connected to the second cross support member and the first support member; and includes a pair of parallel third and fourth internal cross members that are each is connected to the second support member and the second cross support member.

The frame further includes a central support block that is supported by and connected to the first and second cross support members, and the central support block defines a central block opening having a diameter greater than the diameter of the second support pipe such that the second support pipe is capable of passing through and extending beyond the central support block is supported by the locking collar. The frame also has first, second, third and fourth support posts that are mounted on the frame, such that the first and second support posts are connected to the first support member and the third and fourth support posts are connected to the second support member. A screen having a screen opening is mounted on the frame and a bird feeder cover having a cover opening is disposed on the screen. A bird feeder having a bird feeder recess is provided and fitted on the second support post such that the second support post extends through the screen opening and bird feeder cover opening and into the bird feeder recess.

The bird feeder assembly further includes opposed first and second feeder sidewalls and opposed third and fourth feeder sidewalls that are connected with at least one hinge to the opposed first and second support members and the opposed third and fourth support member of the frame, and each of the feeder sidewalls is movable between up and down positions. When in the up position the first, second, third and fourth sidewalls are held in place with thumb screws that extend through the first, second, third and fourth support posts of the frame. When feeder sidewalls are in the down position the bird feeder may be filled with birdseed or it may be cleaned.

In other preferred embodiments only one, two or three of the first, second, third and fourth feeder sidewalls are connected to the frame with hinges. In these embodiments any of the first, second, third and fourth feeder sidewalls that are not connected to the opposed first and second support members and opposed third and fourth support members of the frame with hinges are connected to the support posts and opposed first and second support members and opposed third and fourth support members it abuts and held in place with fasteners such as nails or bolts or screws.

Any birdseed falling out of the bird feeder lands on the bird feeder cover for the birds to eat, or can be cleaned by the property owner and put back in the birdfeeder. Thus, a minimal amount of birdseed ends up on the ground and varmints never have an opportunity to access or eat the birdfeed.

In another preferred embodiment the first and second support posts are part of the first feeder sidewall that is hinged to the frame, and the third and fourth side posts are part of the second feeder sidewall that is hinged to the frame.

In another preferred embodiment shields are provided and connected to the first, second, third and fourth feeder sidewalls.

The first, second, third and fourth feed sidewalls may be made of clear plastic. The clear plastic may be Plexiglas® in one of the preferred embodiments, and Plexiglas® is a registered trademark of Arkema France corporation, 420 rue d'Estienne D'Orves, 92700 Colombes, France.

BRIEF DESCRIPTION OF THE DRAWING FIGURES

FIG. 3 is a front plan view of a ground spike.

FIG. 4 is a top view of the ground spike.

FIG. 5 is a side view of a pipe support assembly.

DESCRIPTION

Figure 1:
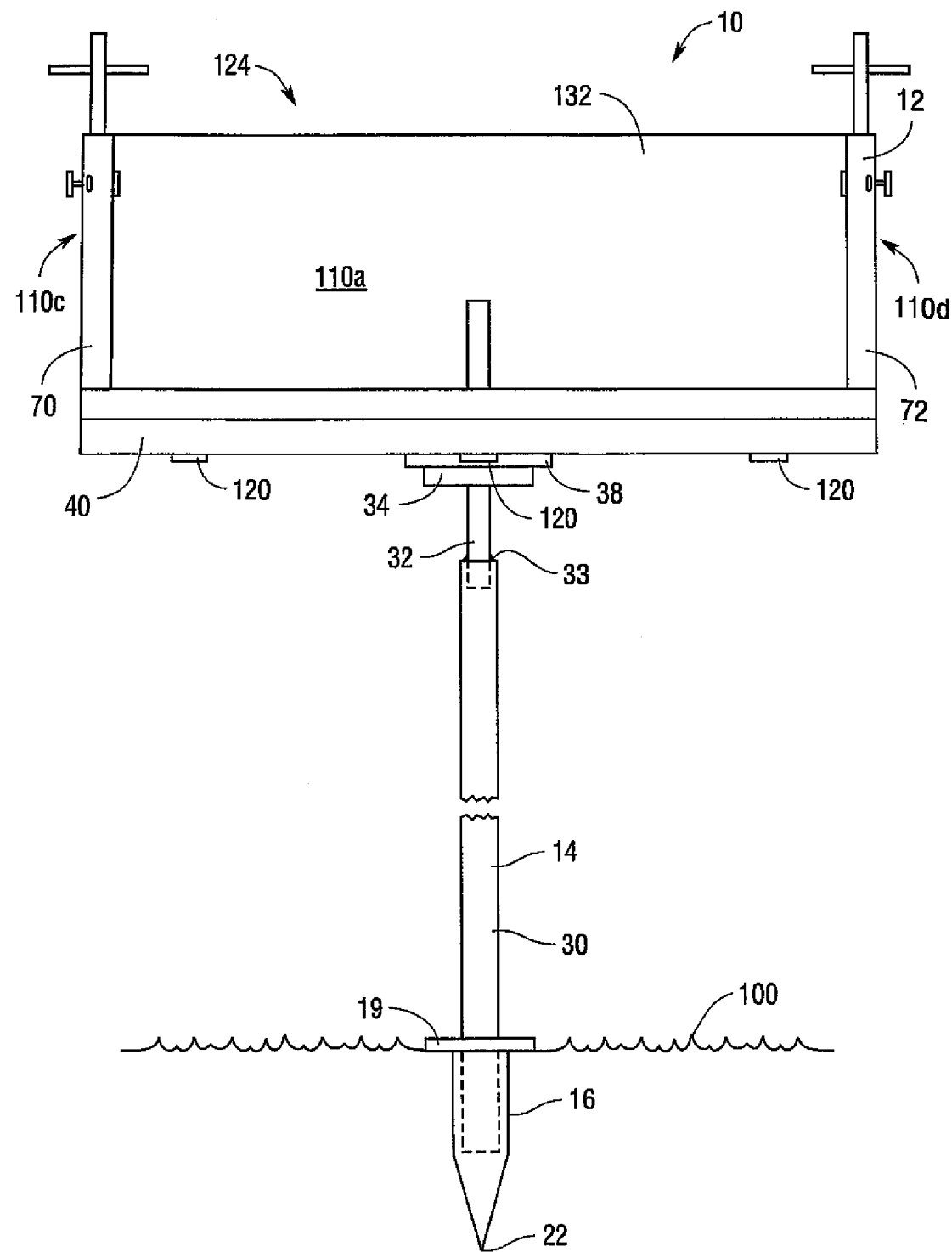
FIG. 1 is a front view of a bird screen showing a bird feeder assembly and a pipe support assembly.
Figure 2:
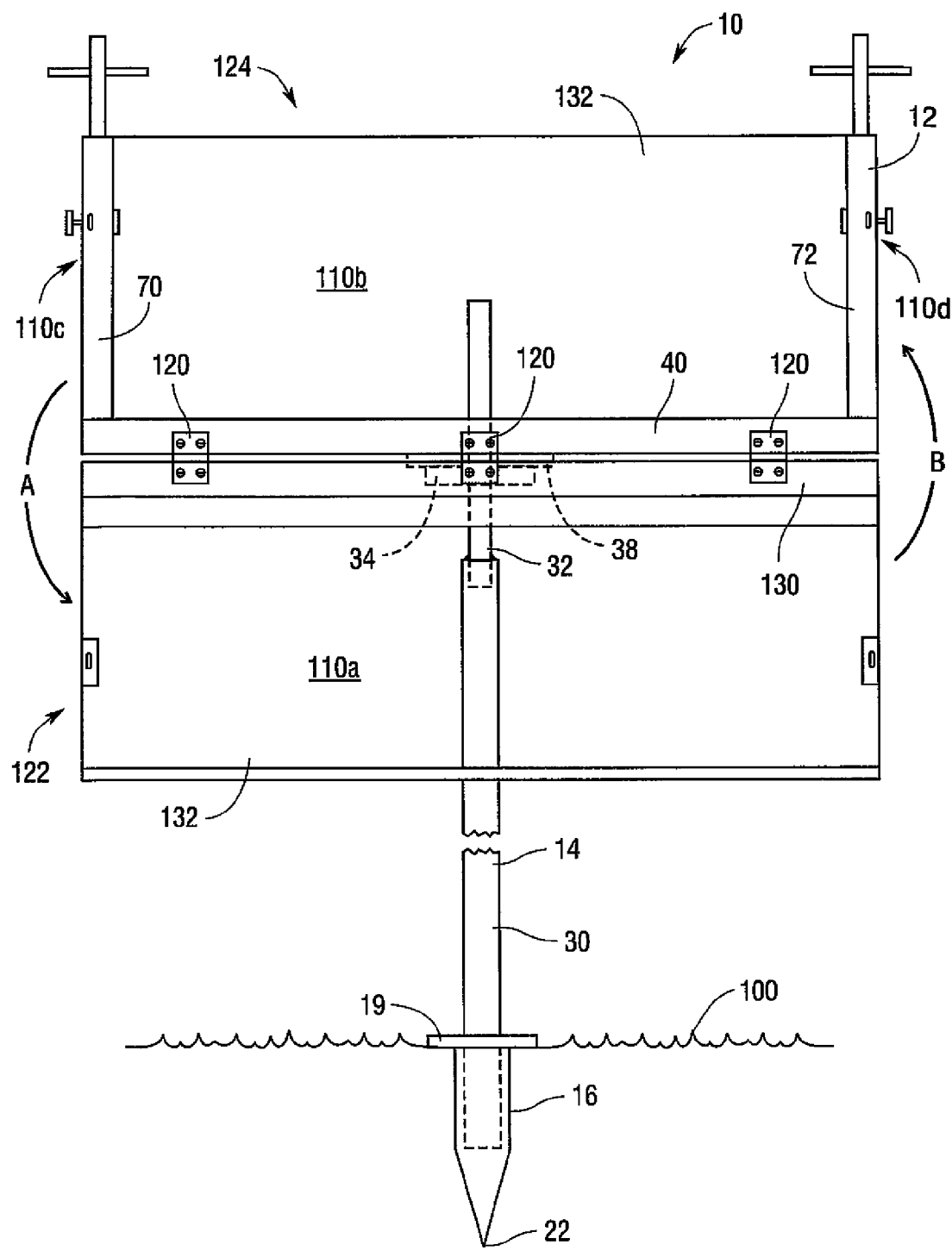
FIG. 2 is a front view of the bird screen wherein a first feeder sidewall of the bird feeder assembly is in a down position.

As shown in FIGS. 1 and 2, there is a bird screen 10 that includes both a bird feeder assembly 12 and a pipe support assembly 14, such that the pipe assembly 14 supports the bird feeder assembly 12.

As shown in FIGS. 3-5, the pipe support assembly 14 includes a ground spike 16 having a spike portion 17 and a flange 19 that defines a flange opening 27. The flange 19 is joined to the spike portion 17 with, for example a weld. The ground spike 16 also defines a ground spike opening 18, such that the flange opening 27 extends to the ground spike opening 18. The ground spike opening 18 leads to a ground spike interior 20 defined in the spike portion 17. The flange opening 27 is rectangular shaped in one of the preferred embodiments, and can be circular shaped in other preferred embodiments. The ground spike 16 has a tip 22 for insertion into the ground 100. In one of the preferred embodiments the ground spike 16 is made of metal, but in other preferred embodiments it can be made of plastic, fiberglass and combinations thereof. In addition, the spike portion 17 has a cylindrical portion 26 that extends to and merges with a tapered portion 23, and the tapered portion 23 extends to the tip 22.

As shown in FIGS. 1, 2 and 5, the pipe support assembly 14 also includes a first support pipe 30 that is moved though the flange opening 27 and the ground spike opening 18, such that the a portion of the first support pipe 30 is disposed in the ground spike interior 20. The ground spike 16 supports the first support pipe 30. The first support pipe 30 may be held in place by the force of gravity or may be joined to the ground spike 16 with, for example a weld. The first support pipe 30 has opposed first and second first support pipe ends 35a, 35b, and the first support pipe end 35a is exposed while the second support pipe end 35 is disposed in the ground spike interior 20. Extending from the first support pipe 30 is a second support pipe 32 and a portion of the second support pipe 32 is fitted in the first support pipe 30. This is possible because the external diameter of the second support pipe 32 is less than the internal diameter of the first support pipe 30. The second support pipe 32 also has an exposed end 36. The first and second support pipes 30, 32 may be joined together with, for example, a support pipe weld 33. As shown in FIG. 5, a locking collar 34 surrounds the second support pipe 32 and is fixed in place such that it is spaced away from the first support pipe end 35a and the exposed end 36 of the second support pipe 32. The locking collar 34 is for providing support and may fixed in place with a compression fit or a weld or by other suitable methods. A support pipe washer 38 is provided and is moved over and around the exposed end 36 of the second support pipe 32 such that it surrounds the second support pipe 32. As shown in FIG. 5 the support pipe washer 38 is supported on the locking collar 34 and is unable to move past the locking collar 34. The pipe support assembly 14, and in particular the support pipe washer 38 supports the load imposed by the bird feeder assembly 12.

It is pointed out that the pipe support assembly 14 described above is self supporting, that is, it stands on its own and supports the load of the bird feeder assembly 12, such that the bird screen 10 requires no additional or external support structures to maintain it in a vertical position relative to the ground 100.

Figure 6:
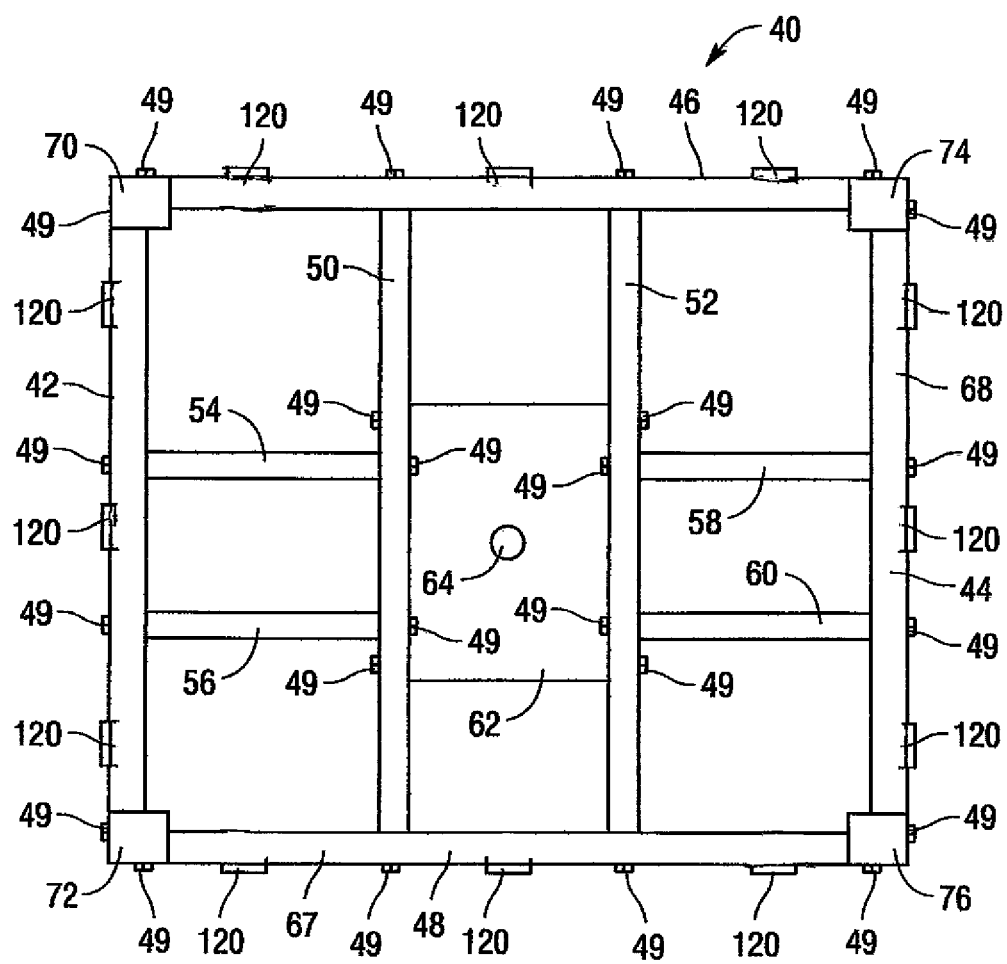
FIG. 6 is a top view of the a frame of the bird feeder assembly.

As shown in FIGS. 1, 2 and 6-12 the bird feeder assembly 12 includes a frame 40. In particular, as shown in FIG. 6 the frame 40 that has opposed first and second support members 42, 44 and opposed third and fourth support member 46, 48. The first and second support members 42, 44 are each connected to the opposed third and fourth support member 46, 48 with fasteners, for example, bolts, screws or nails commonly designated 49, such the frame 40 has a rectangular shape or a square shape. It is pointed out that for the sake of clarity only some of the fasteners 49 are shown in FIG. 6, and the use and placement of fasteners 49 to hold a frame together is well known to one having one having ordinary skill in the art. The frame 40 has opposed first and second opposed first and second frame sides 67, 68 (shown in FIGS. 7 and 8).

The frame 40 further includes a pair of parallel first and second cross support members 50, 52, and each of the first and second cross support members 50, 52 is joined or connected to each of the third and fourth support members 46, 48 with fasteners 49, for example nails or bolts.

The frame 40 also includes a pair of parallel first and second internal cross member 54, 56 that are each connected to the second cross support member 50 and the first support member 42. There is also a pair of parallel third and fourth internal cross members 58, 60 that are each is connected to the second support member 44 and the second cross support member 52.

Figure 7:
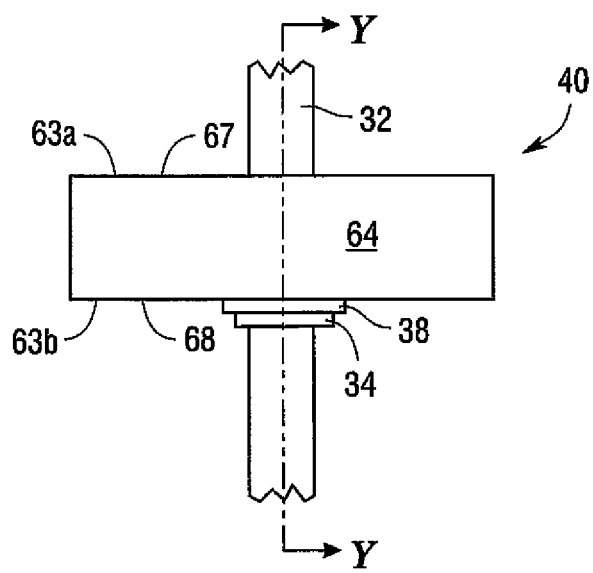
FIG. 7 is a side view of a second support pipe extending through a central support block.
Figure 8:
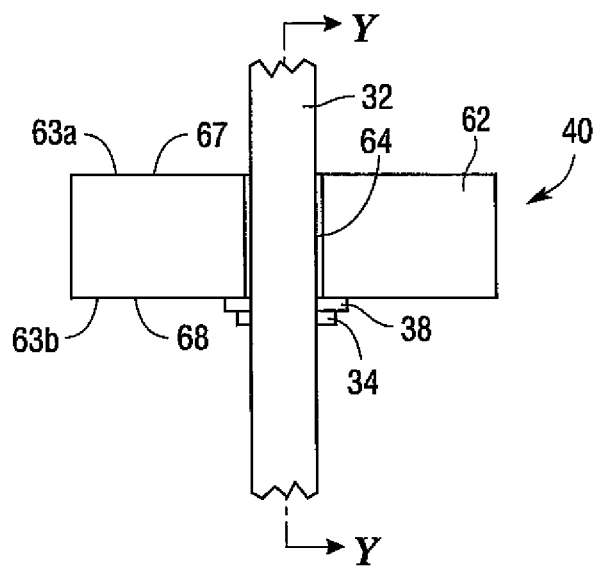
FIG. 8 is a sectional view of the second support pipe extending through the central support block taken along line Y-Y of FIG. 7.

The frame also includes a central support block 62 is supported by the first and second cross support members 50, 52. As shown in FIGS. 6-8 the central support block 62 defines a central block opening 64 that is sized to accommodate the second support pipe 32 therein, such that the second support pipe 32 is capable of passing through and extending beyond the central support block 62 until the support pipe washer 38 abuts against the second frame side 68, and in particular the central support block 62. The central support block 62 has opposed first and second central support block sides 63a, 63b. FIGS. 7 and 8 show the second support pipe 32 positioned in the central block opening and show the central support block 62 supported on the support pipe washer 38. The locking collar 34 supports the support pipe washer 38. In one of the preferred embodiments the above-described frame support 40 is made of wood and held in place with fasteners 49, and in other preferred embodiments may be made of plastics, metals and combinations of all these materials.

It is pointed out that the frame may be made of wood, plastic, metals and combinations thereof and may be formed as a one piece body.

As he best shown in the sectional view of FIG. 8, the support pipe washer 38 and locking collar 34 are sized so that they are incapable of passing through the central block opening 64. This thus allows the support pipe washer 38 to support the load imposed on it from the bird feeder assembly 12.

Figure 9:
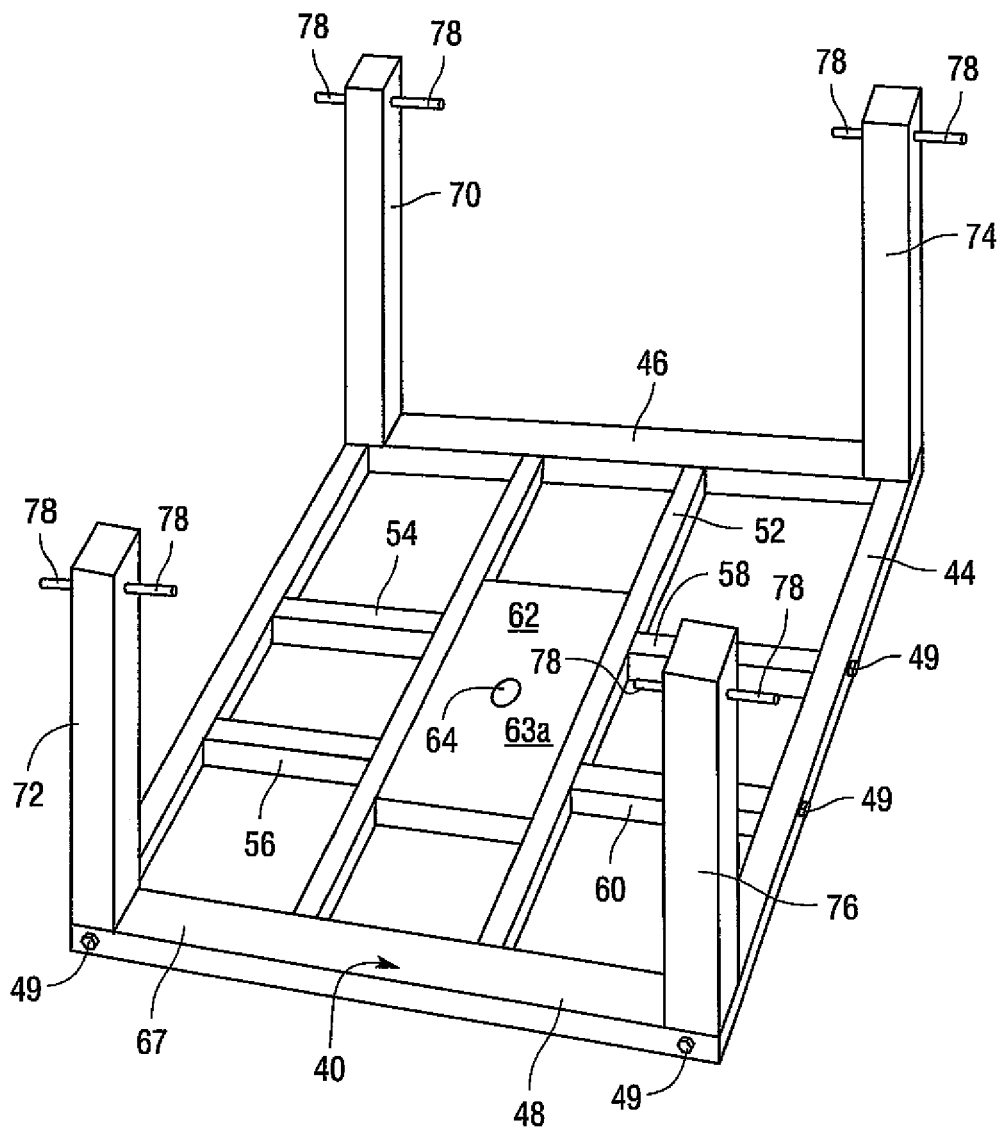
FIG. 9 is a top perspective view of the frame of the bird feeder assembly showing a plurality of support posts that are joined to the frame support.
Figure 10:
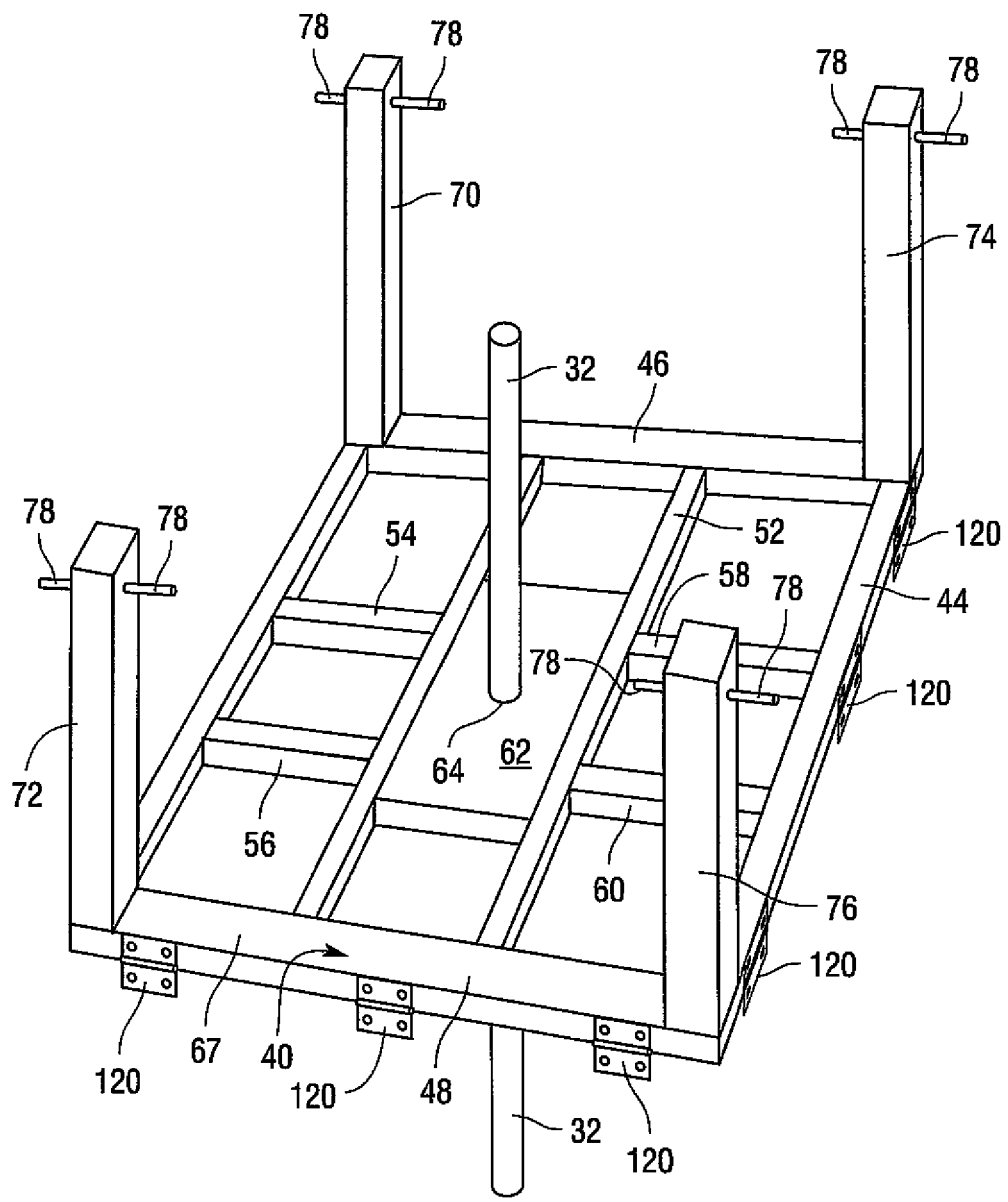
FIG. 10 is a top perspective view of the frame of the bird feeder assembly showing a portion of the pipe support assembly.
Figure 11:
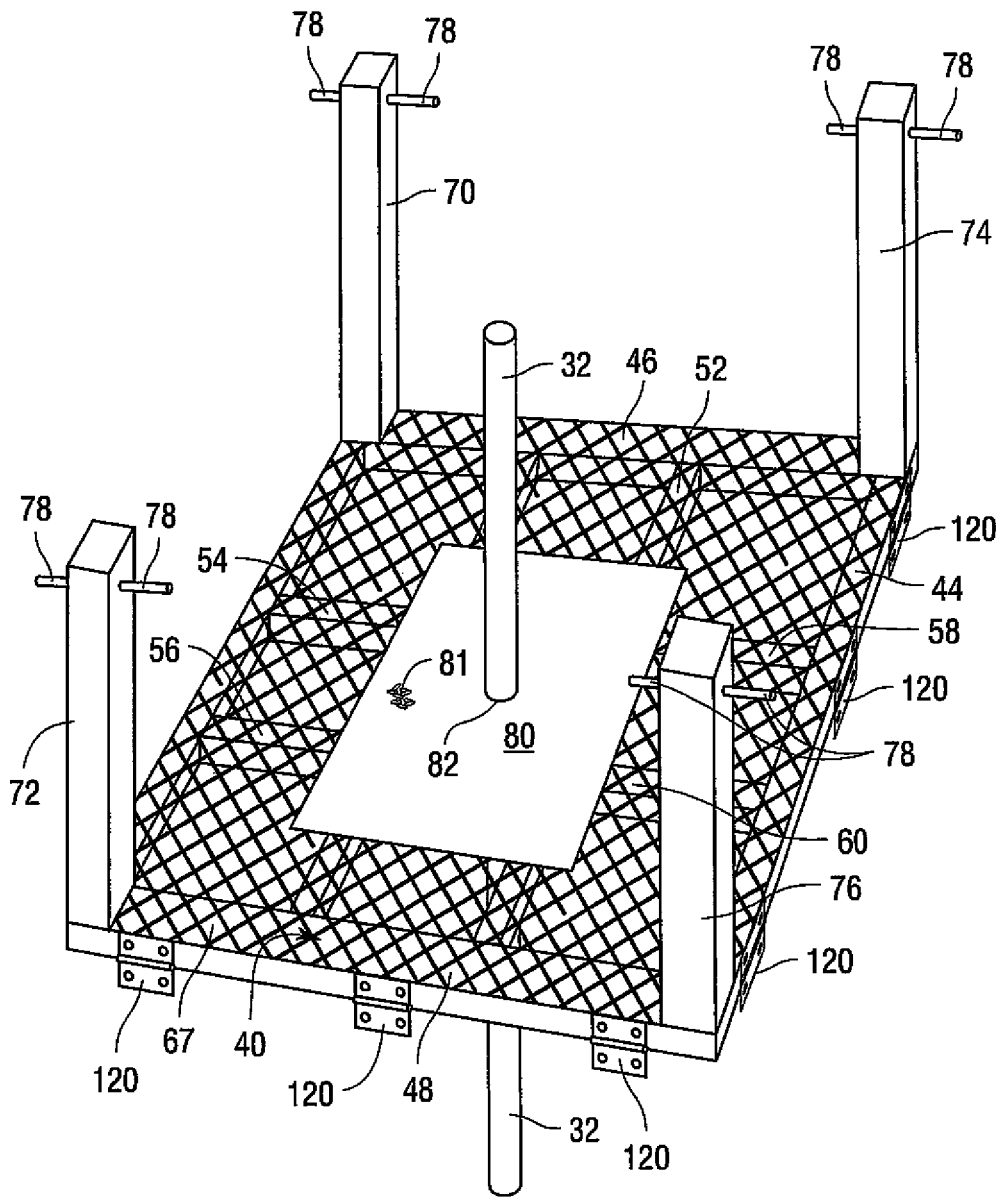
FIG. 11 is a top perspective view of the frame of the bird feeder assembly showing a portion of the pipe support assembly and a bird feeder cover.
Figure 12:
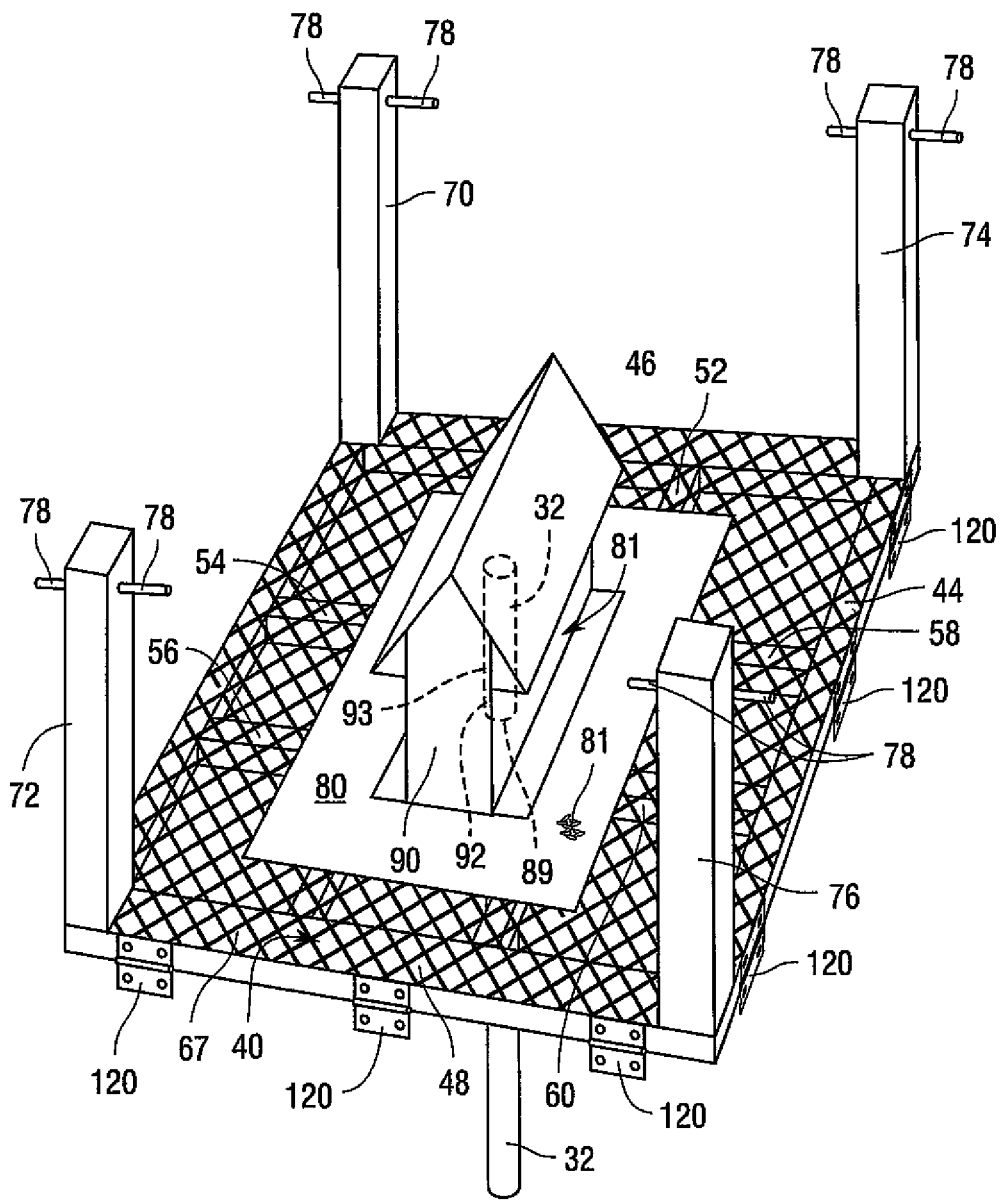
FIG. 12 is a top perspective view of the frame of the bird feeder assembly showing a bird feeder supported on the bird feeder cover and a screen.

As shown in FIGS. 6 and 9, the frame 40 further includes first, second, third and fourth support posts 70, 72, 74, 76 that are mounted on the frame and extend in a direction away from the first frame side 67. As shown in FIG. 9, the first and second support posts 70, 72 are connected or mounted on the first support member 42, and the third and fourth support posts 74, 76 are connected to or mounted on the second support member 44. The connections may be with fasteners 49, for example screws, bolts, nails or other suitable fasteners 49. As shown in FIG. 12, extending from each of the first, second, third and fourth support posts 70, 72, 74, 76 are perches, commonly designated 78 for birds. As shown in FIG. 10 the second support pipe 32 extends through the central block opening 64, and as shown in FIG. 11 there is a bird feeder cover 80 that defines a bird feeder cover opening 82. The bird feeder cover opening 82 is sized such that the second support pipe 32 is capable of passing through the bird feeder cover 80. The bird feeder cover 80 is for providing a surface for supporting spilled birdseed 81.

Returning to FIG. 12, there is a screen 88 that is supported on and connected to the first frame side 67 of the frame 40. It is pointed out that the screen extends under the bird feeder cover 80 such that it is sandwiched between the frame 40 and the bird feeder cover 80. In addition, the screen 88 defines a screen opening 89 such that the second support pipe 32 is capable of passing through the screen 88. FIG. 12 also shows a bird feeder 90 supported on the bird feeder cover 80. In particular, a portion of the second support pipe 32 extends into a bird feeder pipe recess 92 defined in the bird feeder 90. In one of the preferred embodiments the bird feeder pipe recess 92 is defined by a bird feeder pipe 93 that has an internal diameter greater than the diameter of the second support pipe 32, such that the second support pipe 32 can be received therein. The second support pipe 32 holds the bird feeder 90 in place and the bird feeder 90 can be manually lifted on and off the second support pipe 32. The bird feeder 90 can be filled with birdseed 81 and any excess birdseed 81 will fall on the bird feeder cover 80 and not on the ground 100. The screen 88 allows the birds a place to walk and keeps animals, for example squirrels from accessing the birdseed 81. The screen 88 is embodied has heavy gauge wire mesh with small openings in one of the preferred embodiments, such that animals are unable to through the openings in the screen 88 nor are they able to bite or scratch their way through the screen 88. The screen 88 may also be made of hard durable plastic materials, fiberglass and combinations thereof.

As shown in FIGS. 1, 2, 6, and 13-14 and 17A, there are hinges, commonly designated 120, and the hinges 120 are connected to the frame 40 with fasteners 49, for example screws. In particular, at least one hinge 120 is connected to the opposed first and second support members 42, 44 and the opposed third and fourth support members 46, 48 of the frame 40. The at least one hinge 120 numbers three in one of the preferred embodiments. In one of the preferred embodiments, the hinges 120 are also connected to opposed first and second feeder sidewalls 110a, 110b (FIGS. 1, 2 and 13), and opposed third and fourth feeder sidewalls 110c and 110d (FIG. 13), such that the first, second, third and fourth feeder sidewalls 110a, 110b, 110c, and 110d can be moved on the hinges 120. In particular, the hinges 120 connect the first support member 42 to the first feeder sidewall 110a, and hinges 120 connect the second support member 44 to the second feeder sidewall 110b, and the hinges 120 connect the third support member 46 to the third feeder sidewall 110c, and the hinges 120 connect the fourth support member 48 to the fourth feeder sidewall 110d in one of the preferred embodiments. As shown in FIG. 1, the first feeder sidewall 110a is in an up position 124, and as shown in FIG. 2 the first feeder sidewall 110a has been moved to a down position 122, with the arrow designated A showing the movement of the first feeder sidewall 110a to the down position 122. The second, third and fourth feeder sidewalls 110b, 110c and 110d may be moved in an identical manner between up and down positions 124, 122, and each of the opposed third and fourth feeder sidewalls 110c, 110d and opposed first and second feeder sidewalls 110a and 110b are substantially structurally the identical in one of the preferred embodiments. FIG. 2 also shows the second feeder sidewall 110b in the up position 124. The arrows designated B in FIGS. 2 and 13 indicate the movement of the first feeder sidewall 110a to the up position 124. It is pointed out the down position 122 allows a user access, such that bird seed may be added to the bird feeder 90 or for cleaning the bird feeder assembly 12.

Figures 13, 14:
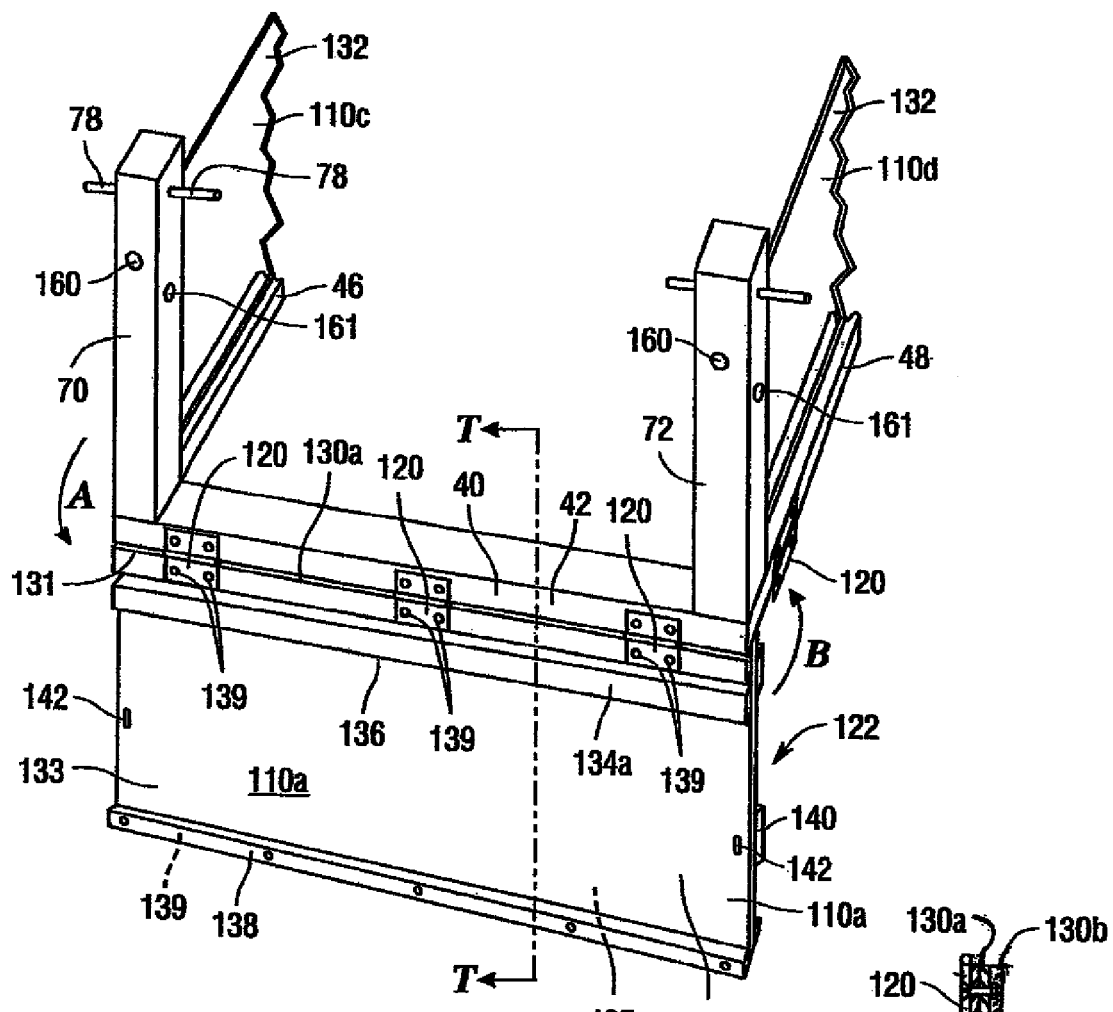
FIG. 13 is a front view of a first feeder sidewall in a down position.
FIG. 14 is a sectional view of the first feeder sidewall taken along line T-T of FIG. 13.

The first, second, third and fourth feeder sidewalls 110a, 110b, 110c and 110d are substantially structurally the same in one of the preferred embodiments, thus only the structure of the first feeder sidewall 110a is described in detail herein. As shown in FIG. 13, the first feeder sidewall 110a also includes a wall sheet 132 that is made of a durable and stiff plastic in other preferred embodiments, and in other preferred embodiments is made of wood, clear plastic, metal, Plexiglas®, or may be made of dark materials. As best shown in FIGS. 13 and 14, first and second hinge strips 130a and 130b are disposed on opposed interior and exterior sheet sides 133, 135 of the wall sheet 132 along a hinged edge portion 131 of the wall sheet 132. The hinges 120 are connected to the first feeder sidewall 110a with fasteners 139, such as screws or bolts, that extend through the first and second hinge strips 130a, 130b and the wall sheet 132, thus securing the first and second hinge strips 130a, 130b to the wall sheet 132. The hinges 120 are also connected to the first support member 42 of the frame 40 thus allowing the first feeder sidewall 110 to swing relative to the frame 40. The first and second hinge strips 130a and 130b are made of metal in one of the preferred embodiments, but may also be made of plastic, fiberglass and other suitable materials.

The wall sheet 132 also has opposed interior and exterior wall sheet sides 133, 135. The wall sheet 132 supports interior and exterior panels 134a, 134b (FIG. 14) that are supported on the interior and exterior wall sheet sides 133, 135, respectively. Fasteners 49 such as bolts and screws may be used to connect the interior and exterior panels 134a, 134b to the wall sheet 132, and in another preferred embodiment a waterproof adhesive may be used. The wall sheet 132 also has an edge member portion 143. A first edge member 138 is connected to the interior wall sheet side 133 along the edge member portions 143, and an opposed second edge member 144 is connected to the exterior wall sheet side 135 along the edge member portion 143, and bolts, screws and waterproof adhesives may be used for connecting purposed. A bead of silicone 136 extends along the joint where the wall sheet 132 and the interior panel 134b meet.

The wall sheet 132 also supports a pair of latch couplers 140 that define latch openings 142, and the latch openings 142 extend through the latch couplers 140. FIG. 14 is a sectional view of the first feeder sidewall 110a taken along line T-T of FIG. 13

Figure 16:
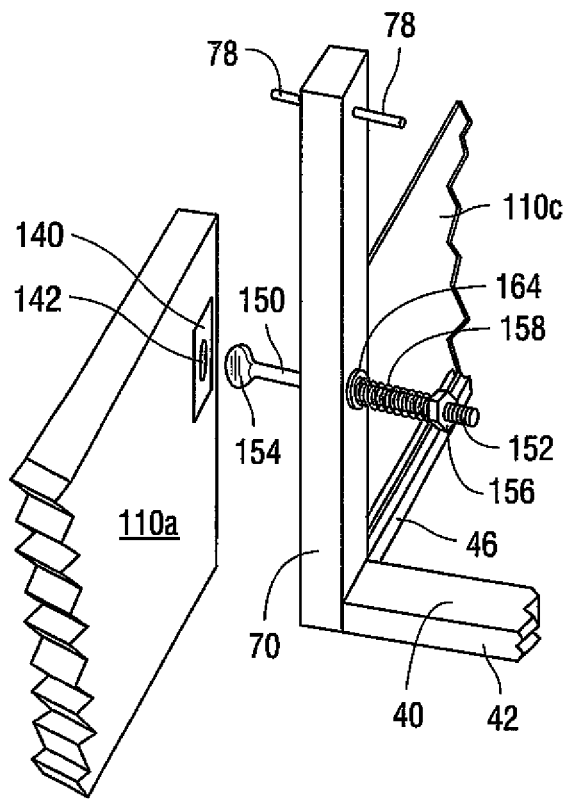
FIG. 16 is a perspective view of a thumb bolt.
Figure 17:
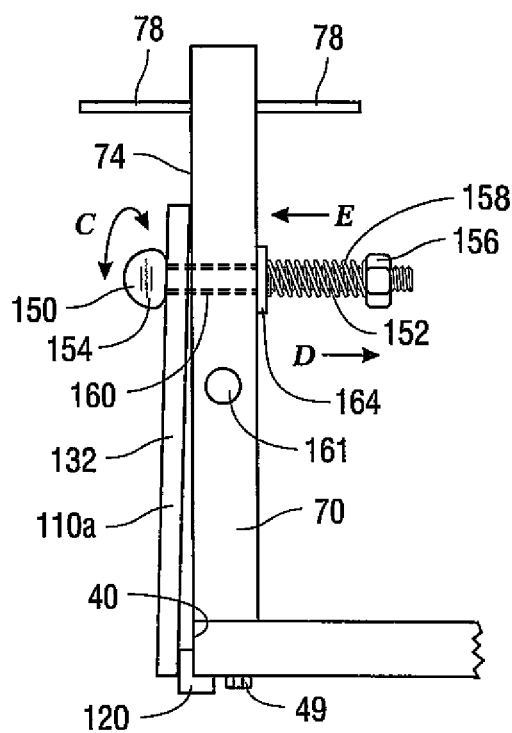
FIG. 17 is a side view of a thumb bolt holding a first feeder sidewall in an up position.

As shown in FIGS. 16 and 17, a thumb screw 150 is shown having a threaded portion 152 and a head portion 154. There is also a nut 156 threaded to the threaded portion 152. Surrounding the threaded portion 152 is a coil spring 158. As the nut 156 is tightened the coil spring 158 compresses (as indicated by arrow E) and as it is loosened the coil spring 158 expands (as indicated by arrow D). As shown in FIGS. 13 and 17-17B, the first and second posts 70, 72 each has a first thumb screw opening 160, and the threaded portion 152 of the thumb screw 150 extends through the thumb screw opening 160. A post washer 164 abuts against the first post 70 and the threaded portion 152 of the thumb screw 150 extends through the post washer 164. The other previously described third and fourth posts 74, 76 also have first thumb screw openings 160.

Figure 17A:
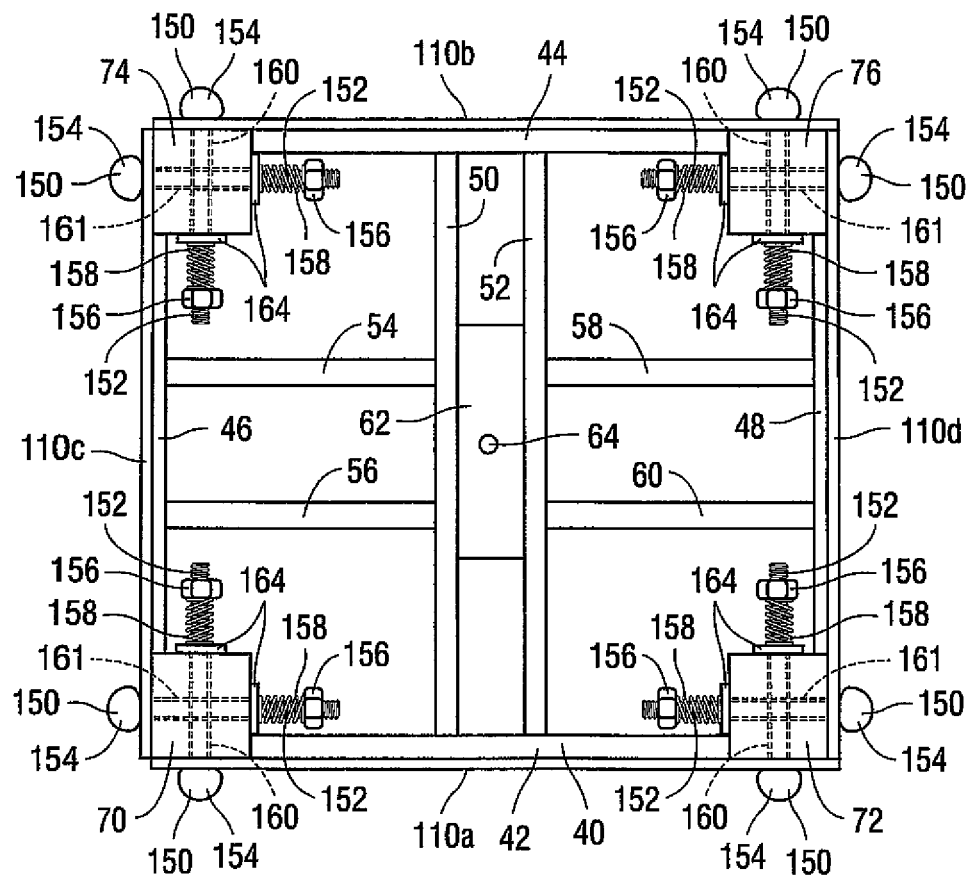
FIG. 17A is a top view of the frame wherein thumb bolts are shown holding first, second, third and fourth sidewalls in an up position.
Figure 17B:
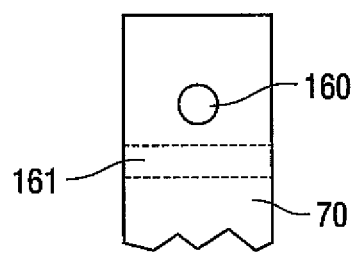
FIG. 17B depict a support post have first and second thumb screw openings.

In addition, as shown in FIGS. 17A and 17B the first post 70 also has a second thumb screw opening 161 that does meet or cross the first thumb screw opening 161. The other previously described second, third and fourth posts 72, 74, 76 also have second thumb screw openings 161. The second thumb screw opening 161 is perpendicular to the first thumb screw opening 160. The second thumb screw openings 161 are called for because each of the first, second, third and fourth posts 70, 72, 74, 76 secures in place two feeder sidewalls when the feeder sidewalls are in the up position 124, thus each of the first, second, third and fourth posts 70, 72, 74, 76 supports two thumb screws 150. In particular as shown in FIG. 17A, the first post 70 is utilized to hold the first and third feeder sidewalls 110a, 110c in the up position 124 by use of two of the thumbscrews 150, the second post 72 is utilized to hold the first and fourth feeder sidewalls 110a, 110d in the up position 124 by use of two of the thumbscrews 150, the third post 74 is utilized to hold the second and third feeder sidewalls 110b, 110c in the up position 124 by use of two of the thumbscrews 150, and the fourth post 76 it utilized to hold the second and fourth feeder sidewalls 110b, 110d in the up position 124 by use of two of the thumbscrews 150.

Each of the first, second, third and fourth feeder sidewalls 110a, 110b, 110c, and 110d can be raised and locked in place by moving the head portions 154 of the thumb screws 150 through the latch openings 142 defined in the latch couplers 140, then rotating the head portion 154 ninety degrees such that it cannot pass through the latch opening 142 The degree to which the sidewalls first, second, third and fourth feeder sidewalls 110a, 110b, 110c, and 110d force against the first second and fourth posts 70, 72, 74, 76 can be adjusted by tightening or loosening the above-described nuts 156. It is pointed out that the latch couplers 140 mounted on the third and fourth feeder sidewalls 110c, 110d such that they are offset relative to the latch couplers 140 mounted on the first and second feed sidewalls 110a, 110b, such that there is clearance for the thumb screws 150.

It is pointed out that the bird screen 10 can be variously embodied and that not all of the first, second, third and fourth feeder sidewalls 110a, 110b, 110c, and 110d need be movable between the up and down positions 124, 122. That is, the bird screen 10 can be embodied such that only the above-described first feeder sidewall 110a is movable on the hinges 120, while the first, second, third and fourth feeder sidewalls 110b, 110c, and 110d are fixed in place with fasteners 49. For example, the second feeder sidewall 110b may be connected to the third and fourth support posts 74, 76 and connected to the second support member 44 of the frame 40 with fasteners 49 such that it is not moveable and no hinges 120 are present. The third and fourth feeder sidewalls 110c and 110d may be fixed in place in a like manner. Or, the first and second feeder sidewalls 110a, 110b may be movable on hinges 120 as described above, while the third feeder sidewall 110c is connected to the first and third support posts 70, 74 and the third support member 46 of the frame 40, and the fourth feed sidewall 110d is connected to the second and forth support posts 72, 76 and the fourth support member 48 of the frame 40. Thus, the bird screen 10 may be embodied such one or more of the first, second, third and fourth feeder sidewalls 110a, 110b, 110c, and 110d is movable between the up and down positions 124, 122.

Figure 15:
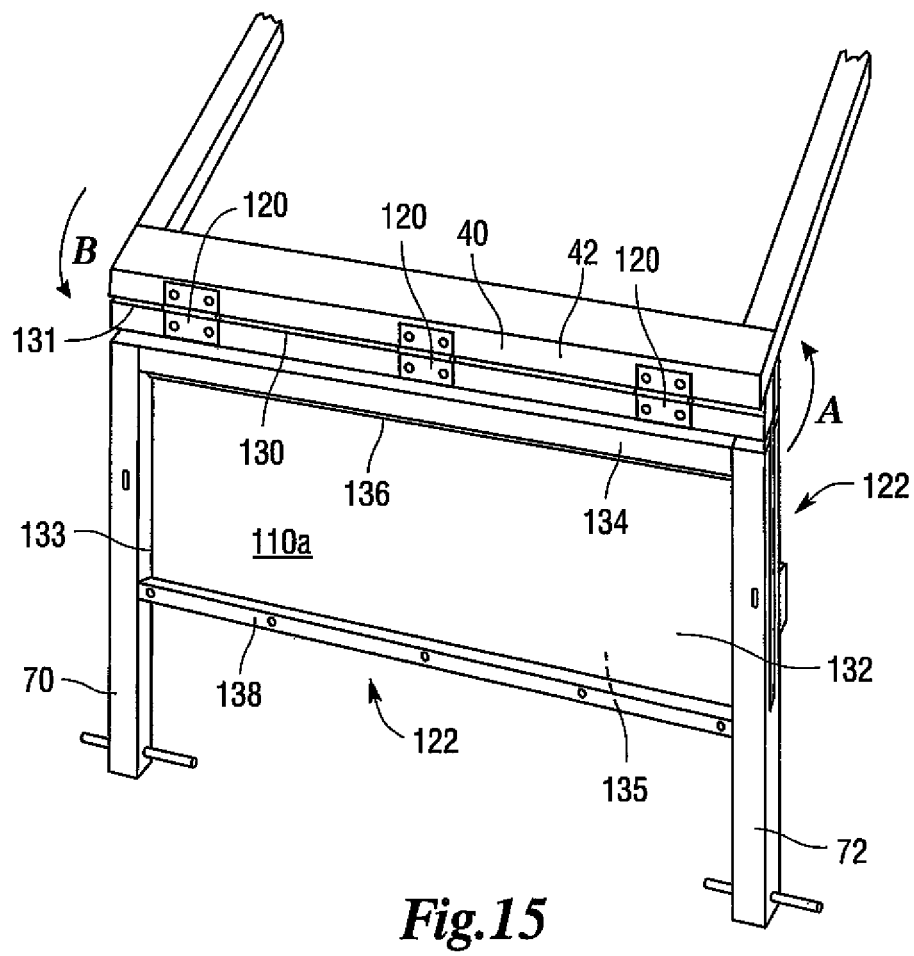
FIG. 15 is a front view of the third feeder sidewall in a down position in an embodiment wherein the second and third support posts are joined to the third feeder sidewall.

In another preferred embodiment shown in FIG. 15 the first, second, third and fourth support posts 70, 72, 74, 76 are connected to feeder sidewalls and are movable with the sidewalls. That is, the first feeder sidewall 110a is connected to and supports the first and second support posts 70, 72 and the opposed second feeder sidewall 110b is connected to and supports the third and fourth support posts 74, 76. In this embodiment the first and second support posts 70, 72 and third and fourth support posts 74, 76 are connected to the sheets 132 with screws and move with the third feeder sidewall to which they are connected. In this embodiment, it is to be understood that although not show, the second feed sidewall 110b is structurally the same as the first feed sidewall 110a.

Figure 18:
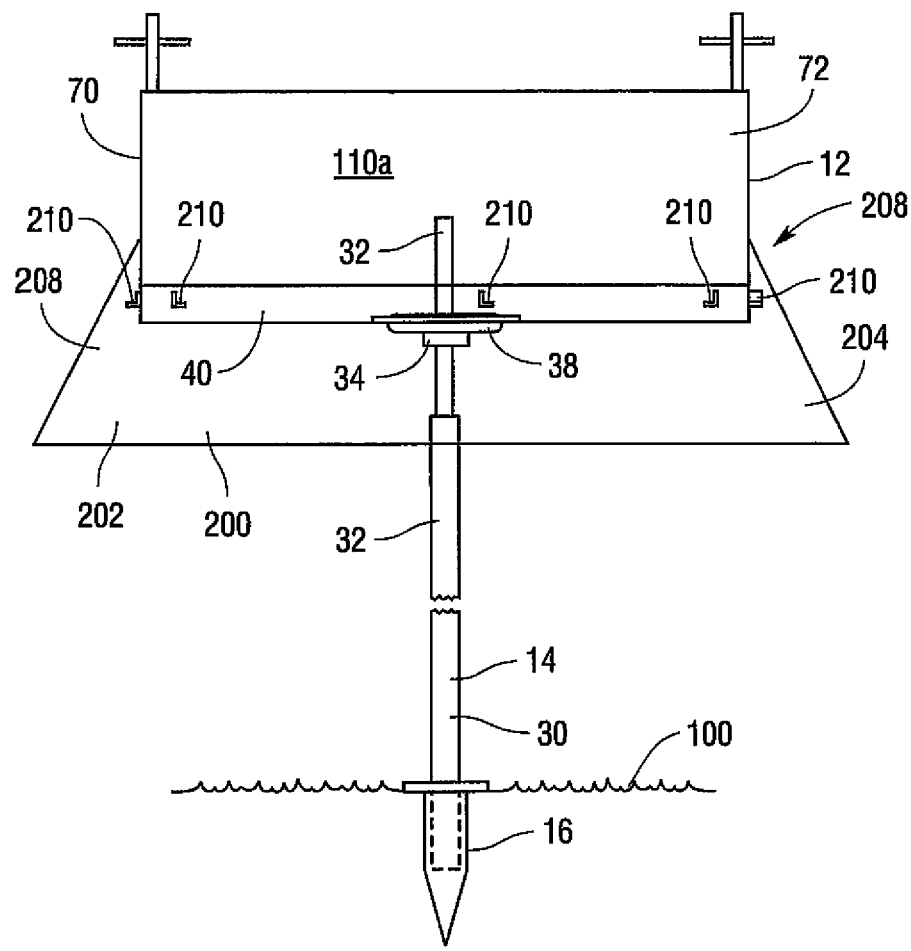
FIG. 18 is a perspective view of the bird screen showing a bird feeder assembly and a pipe support assembly along with a shield assembly.
Figure 19:
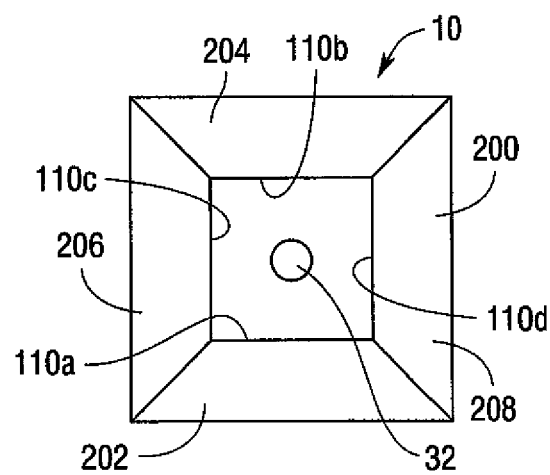
FIG. 19 is a top plan view of the shield assembly.

As shown in FIGS. 18 and 19, in one of the preferred embodiments there is shield assembly 200 that is formed of plastic, for example clear Plexiglas® in one of the preferred embodiments. There are first, second, third and fourth shields 202, 204, 206, 208. The first shield 202 is connected to the first feeder sidewall 110a, the second 204 is connected to the second feeder sidewall 110b, the third shield 206 is connected to the third feeder sidewall 110c, and the fourth shield 208 is connected to the fourth feeder sidewall 110d. Each of the first, second, third and fourth shields 202, 204, 206, 208 is also supported on pair of support brackets 210 that are connected to each of the first, second, third and fourth feeder sidewalls 110a, 110b, 110c, and 110d, or the support brackets 210 may be supported by the first, second, third and fourth shields 202, 204, 206, 208 in another preferred embodiment. There may be more than two support brackets 210. The first, second, third and fourth shields 202, 204, 206, 208 move with their respective feeder sidewalls when the sidewalls are raised and lowered as described above. It is pointed out because the first, second, third and fourth shields 202, 204, 206, 208 flare outwardly as they extend from the frame 40, thus not all of the shields can be lowered at the same time as they would interfere with one another, but opposed shields may be moved at the same time. The first, second, third and fourth shields 202, 204, 206, 208 are for preventing animals from gaining access to the birdseed and shedding water. The first, second, third and fourth shields 202, 204, 206, 208 may be described as having a trapezoidal shape.

It will be appreciated by those skilled in the art that while the a bird screen 10 has been described in detail herein, the invention is not necessarily so limited and other examples, embodiments, uses, modifications, and departures from the embodiments, examples, uses, and modifications may be made without departing from the bird screen 10 and all such embodiments are intended to be within the scope and spirit of the appended claims.

What is claimed:

1. A bird screen comprising:
   a pipe assembly having a ground spike having a ground spike opening and the ground spike defines a ground spike interior;
   the pipe assembly further including a first support pipe having opposed first and second first support pipe ends and wherein the second support pipe end of the first support pipe is disposed in the ground spike interior and the first support pipe end of the first support pipe is exposed and the first support pipe has an internal diameter, and the pipe assembly includes a second support pipe having an external diameter that is less than the internal diameter of the first support pipe and a portion of the second support pipe is fitted in the first support pipe such that the second support pipe extends from the first support pipe and the second support pipe has an exposed end and wherein the second support pipe is joined to the first support pipe;
   the pipe assembly further includes a locking collar that is fitted around the second support pipe and held in place such that the locking collar is spaced from the first support pipe end of the first support pipe and spaced the exposed end of the second support pipe;
   a bird feeder assembly fitted on the second support pipe such that the bird feeder assembly is supported on the locking collar;
   a support pipe washer that surrounds the second support pipe and is disposed such that it abuts against the locking collar and abuts against the bird feeder assembly such that the bird feeder assembly is unable to move past the locking collar,
   a flange that defines a flange opening and the flange is joined to the ground spike such that the flange opening leads to the ground spike opening and the flange opening is sized to allow the first support pipe to pass therethrough;
   wherein the bird feeder assembly includes a frame having opposed first and second support members that are connected to opposed third and fourth support members and includes a pair of parallel first and second cross support members that are connected to each of the third and fourth support members, and includes a pair of parallel first and second internal cross member that are each connected to the second cross support member and the first support member, and includes a pair of parallel third and fourth internal cross members that are each is connected to the second support member and the second cross support member;
   the frame further includes a central support block that is supported by and connected to the first and second cross support members, and the central support block has opposed first and second central support block sides and defines a central block opening having a diameter greater than the diameter of the second support pipe such that the second support pipe is capable of passing through and extending beyond the central support block until the support pipe washer abuts against a second central support block side;
   wherein the frame has opposed first and second frame sides and the frame has first, second, third and fourth support posts that are mounted on the frame that extend in a direction away from the first frame side and the first and second support posts are connected to the first support member and the third and fourth support posts are connected to the opposed second support member;
   wherein the bird feeder assembly further includes a screen that defines a screen opening that is supported on and connected to the first frame side and a bird feeder cover that defines a bird feeder cover opening is disposed on the screen and the bird feeder cover opening and the screen opening are aligned and the second support pipe extends through the bird feeder cover opening and the screen opening, and wherein the bird feeder assembly further includes a bird feeder that is disposed on the bird feeder cover and wherein the bird feeder defines a bird feeder recess sized to receive the second support pipe and the second support pipe extends into the bird feeder recess such that the bird feeder remains in a fixed position;
   the bird feeder assembly further wherein a hinge connects the first support member and a first feeder sidewall and the first feeder sidewall is movable between an up position and a down position;
   wherein another hinge connects the second support member to a second feeder sidewall that is opposed to the first feeder sidewall, and another hinge connects the third support member to a third feeder sidewall, and another hinge connects the fourth support member to a fourth feeder sidewall such that the third and fourth feeder sidewalls are opposed, and wherein each of the second, third and fourth feeder sidewalls are movable between an up position and a down positions;
   the first feeder sidewall includes a wall sheet having opposed interior and exterior sides and first and second hinge strips are disposed on the opposed interior and exterior sides along a hinged edge portion of the wall sheet and the hinges are connected to the first feeder sidewall with fasteners that extend through the first and second hinge strips and the wall sheet such that the first feeder sidewall can swing relative to the frame;
   further including latch couplers that define latch openings and wherein the first feeder sidewall supports a pair of latch couplers and the latch openings extend through the latch couplers and further including thumb screws and each thumb screw has a threaded portion and a head portion and wherein each of the first, and second support posts defines a first thumb screw opening for receiving a thumb screw therein and wherein the latch openings are sized such that the head portions of thumb screws can pass through the latch openings;
   wherein when the first feeder sidewall is in the up position the thumb screws extends through the first thumb screw openings defined in the first and second support posts and through the first feeder sidewall; and,
   further including a coil springs and nuts that are threaded to the threaded portions of the thumb screws and wherein the coil spring surrounds the threaded portions and are disposed between first and second support posts and the nuts such that the amount of force exerted on the latch couplers to hold the first feeder sidewall in the up position can be adjust by rotating the nuts, and the first feeder sidewall is in the up position the thumb screws are rotated ninety degrees such that head portions are unable to pass through the latch openings.

2. The bird screen according to claim 1 further including a first shield that is connected to the first feeder sidewall and where the first shield flares outwardly as it extends in a direction away from the first feeder sidewall such that it has a trapezoidal shape.

\* \* \* \* \*